United States Patent [19]

Smith et al.

[11] Patent Number: 5,306,325
[45] Date of Patent: Apr. 26, 1994

[54] MOLD CLAMPING MECHANISM FOR GLASS CONTAINER FORMING MACHINE

[75] Inventors: Richard L. Smith, Upland; Homer E. Miller, LaFontaine; Roger L. Erb, Marion, all of Ind.

[73] Assignee: American National Can Company, Chicago, Ill.

[21] Appl. No.: 43,017

[22] Filed: Apr. 5, 1993

[51] Int. Cl.$^5$ ............................................. C03B 9/353
[52] U.S. Cl. .................................... 65/357; 425/541; 65/360
[58] Field of Search ................ 425/541; 65/359, 360, 65/357

[56] References Cited

U.S. PATENT DOCUMENTS

| | | |
|---|---|---|
| 1,213,853 | 1/1917 | Ferngren . |
| 1,331,472 | 2/1920 | Peiler et al. . |
| 1,529,622 | 2/1922 | Haley ............................. 65/357 |
| 1,534,878 | 4/1925 | Stenhouse . |
| 1,578,400 | 3/1926 | Cramer . |
| 1,856,577 | 5/1932 | McLaughlin . |
| 2,051,468 | 8/1936 | Cook ............................. 65/360 |
| 2,131,241 | 10/1934 | Wadsworth ................ 65/360 |
| 2,304,736 | 12/1942 | Louden et al. . |
| 2,361,553 | 8/1940 | Luertzing ..................... 65/360 |
| 2,942,382 | 6/1960 | Hamilton . |
| 3,206,296 | 9/1965 | Minnitt . |
| 3,472,639 | 10/1969 | Mumford . |
| 3,499,747 | 3/1970 | Dahlman et al. . |
| 3,528,796 | 9/1970 | Trahan . |
| 3,580,712 | 5/1971 | Mumford . |
| 3,778,246 | 12/1973 | Rankl ........................... 65/360 |
| 3,887,351 | 6/1975 | Dahlman et al. ............ 65/305 |
| 4,065,286 | 12/1977 | Becker .......................... 65/229 |
| 4,101,306 | 7/1978 | Schaar .......................... 65/323 |
| 4,978,380 | 12/1990 | Nebelung et al. ........... 65/260 |

FOREIGN PATENT DOCUMENTS 0638551 12/1978 U.S.S.R. ............................ 65/359

*Primary Examiner*—W. Gary Jones
*Assistant Examiner*—John Hoffmann
*Attorney, Agent, or Firm*—Wallenstein, Wagner & Hattis, Ltd.

[57] ABSTRACT

A mold locking system is provided for a glass molding machine. The machine has first and second mold hanger support arms for moving respectively first and second mold halves. The arms are pivotally cantilever-mounted at their ends for rotation about a vertical axis between a retracted station where the mold halves are separated and a forming station where the mold halves are brought into contact. The locking system includes a pressure system for exerting an upward force on the free ends of the support arms and includes surfaces configured to pressingly engage specially configured portions of the free arm ends so that operation of the pressure system forces the free ends towards each other to ensure closure of the mold, and to force the free ends up against a limit stop to terminate upward travel to compensate for sag and mounting system wear.

14 Claims, 2 Drawing Sheets

MOLD CLAMPING MECHANISM FOR GLASS CONTAINER FORMING MACHINE

TECHNICAL FIELD OF THE INVENTION

This invention relates generally to apparatus for the manufacture of glass containers. More particularly, it pertains to an apparatus which locks container-forming mold halves together at a glass forming station.

BACKGROUND OF THE INVENTION

Glass containers, including glass bottles, are formed in a process that is well-known in the art. The various components of the glass (i.e. the batch) are heated until they have melted. A gob of this melted glass is next formed into a parison in a so-called blanking or parison mold. The parison formed is moved from the blanking mold to a finishing or blow mold, where the finished bottle is shaped.

Mass production of glass bottles is generally carried out in a well-known IS (individual section) glass forming machine which has a plurality of glass forming means integrated into a single plural-section machine fed by a single source of molten glass. The sections are operated in synchronism in such relative phase relationship to permit the several sections to acquire gobs of molten glass in ordered sequence from the single source.

Thus, as one of the sections is receiving a gob from the feeding means, another section is delivering a finished article to an output conveyor and other sections are engaged in various forming steps between receipt of the gob and production of the finished article. The sequence of operation is controlled by a timing mechanism that may be either mechanically or electronically controlled. This timing mechanism sequentially initiates mechanical devices in a predetermined synchronized sequence through automatic control systems.

The IS machines have two molds in each individual mold section, whereby a gob is received in a first mold, called a parison mold, for the initial process of forming a parison, followed by transfer of the parison to a second mold, called the blow or finishing mold, for blowing the parison to its final configuration. A transfer arm is pivoted between the parison mold and the finishing mold, and the parison is formed in an inverted position in the parison mold and is transferred to the finishing mold in an upright position. This process is generally disclosed in U.S. Pat. No. 3,762,907, incorporated herein by reference.

U.S. Pat. No. 4,983,203 issued to Erb et al., also incorporated herein by reference, discloses a glass forming system wherein parison mold halves are mounted on a pair of mold hanger arms movable between a retracted position and a closed position at a parison-forming station. Pairs of neck ring mold halves forming neck ring molds are held together at the parison-forming station and are configured for nesting surrounding engagement by the parison mold halves when the parison mold halves are brought together.

The opening and closing of the molds are accomplished typically by operation of an air cylinder acting through a series of linkages, typically involving shafts, pins and levers. The mold hanger arms are each cantilever-mounted at one end for pivotal rotation about a post, and the linkages serve to move the arms in an arcuate motion between closed and open positions. The air cylinder and linkages also provide the clamping forces necessary to hold the mold halves closed during the pressing of the glass at the parison-forming station or the blowing of the glass at the finishing mold station. This system has many wear points, and as the wear increases, it causes misalignment of parts and causes the mold halves to fail to close tightly. Moreover, particularly in the case of systems having long hanger arms, such wear will cause the hanger arms to sag downward from a horizontal position, causing misalignment of the neck ring mold halves with respect to the parison mold halves. As a result, defective products are formed. Additionally, particularly in multi-mold assemblies, relatively massive hanger arms are necessary to maintain clamping forces to hold the molds in proper alignment. This increased mass in turn reduces the operating speed of the system.

Various older designs eliminate the sagging problem of the hanger arm outer ends by physically supporting the lower surfaces of the hanger arms by means of substrate plates against which the lower faces of the hanger arms are frictionally supported. Examples of such systems are shown in U.S. Pat. No. 1,213,853 issued to Ferngren on Jan. 30, 1917; U.S. Pat. No. 1,331,471 issued to Peiler, et. al., on Feb. 17, 1920 and U.S. Pat. No. 2,304,736 issued to Louden et al on Dec. 8, 1942. The mold halves shown therein are provided with terminal projections or jaws disposed in general prolongation of the major direction of the hanger. In the Ferngren and Peiler systems a wedge is provided to be driven between the jaws, the jaws and wedge mating surfaces causing the mold halves to be pressed together. A similar function is provided in the Louden patent by forcing camming surfaces to engage such projections when a pair of cams are forced towards the general vicinity of the mold halves. These patents appear to show adequate mold closure systems, but since they are all used in conjunction with table-supported hangers, the alignment problem does not arise.

On the other hand, U.S. Pat. No. 3,528,796, issued to Trahan on Sep. 15, 1970 shows a true cantilever dual mold hanger system and locking mechanism. As in the Ferngren and Peiler patents, a wedge is configured to engage forwardly extending projections on each mold hanger, the wedge being driven horizontally towards the hanger support pivot 18 (FIG. 1). This action, while securely closing the hanger arms and their associated mold halves, does not provide a solution to the removal of cantilever sag in such systems.

SUMMARY OF THE INVENTION

It is an object of the invention to provide a reliable system for ensuring mold closure and proper mold alignment while allowing the use of mold hanger arms of substantially reduced mass.

According to the invention, a mold locking system is provided for a glass molding machine. The machine has first and second mold hanger arms for supporting respectively first and second mold halves. The hanger arms have first and second ends and upper surfaces, and are pivotally mounted at their first ends for rotation about a vertical axis between a retracted station where the mold halves are separated and a forming station where the mold halves are brought into contact. The locking system includes pressure means for exerting an upward force on the second ends of the support arms. The pressure means includes surfaces configured to pressingly engage portions of the second arm ends so that operation of the pressure means forces the second ends towards each other so as to ensure closure of the mold. Limit stop means are provided for terminating upward travel of the second ends when the support arms are in a given position.

In the preferred form of the invention, first and second locking bosses are disposed affixed at the extremities of the second ends of the support arms to extend generally parallel and downward away from their associated second ends. Planar facets on a portion of each boss farthest away from the other boss are oriented so that their planes converge downward towards each other. The pressure means takes the form of a pressure member mounted for reciprocating movement in a vertical direction and having a recess provided with a pair of facets configured to nestingly accept the boss facets so that upward movement of the pressure member forces the bosses together, thereby securely locking the mold halves together. Lifting means controllably raise and lower the pressure member into and out of engagement with the bosses. The limit stop means are configured for engagement with the upper surfaces of the second ends so as to terminate the upward travel thereof.

Thus, by divorcing the locking function from the mold hanger arm drive mechanisms, lighter hanger arms resulting in higher operating speeds are possible. Moreover, use of the limit stop feature automatically restores the mold hanger arms to a proper horizontal position, thereby markedly reducing the reject rate as the mold hanger arm mountings undergo wear, or where they have a natural tendency to sag because of the employment of a large number of heavy molds carried thereon.

Other advantages and aspects of the invention will become apparent upon making reference to the specification, claims, and drawings to follow.

DETAILED DESCRIPTION OF THE INVENTION

Figure 1:
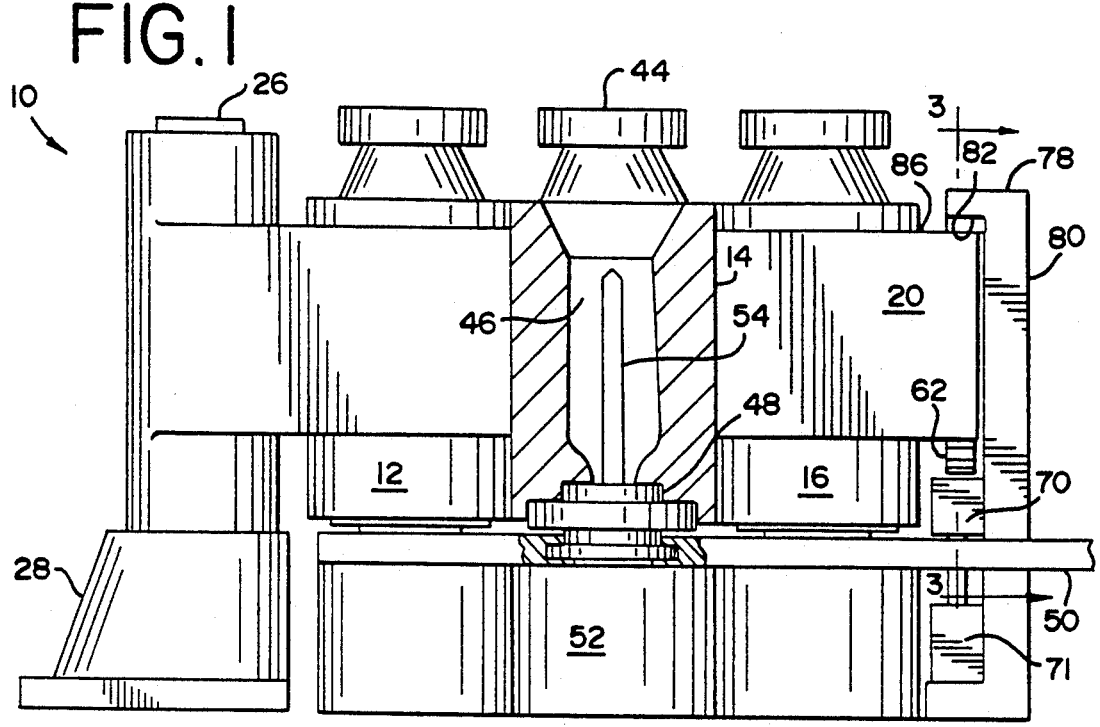
FIG. 1 is a schematic, partially cut-away side view of elements of a glass forming machine at a parison-forming station.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Figure 2:
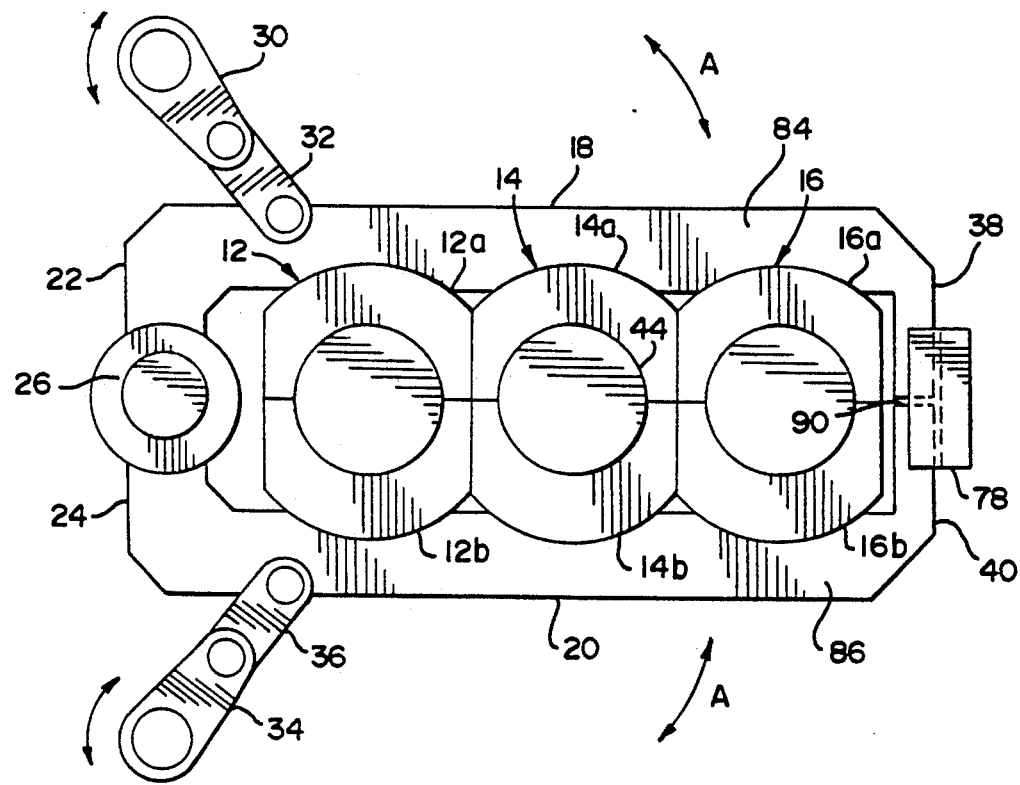
FIG. 2 is a schematic top view of the principal upper elements shown in FIG. 1.

Referring initially to FIGS. 1 and 2, a molding system 10 supports three molds 12, 14, 16 at a forming station. In the examples shown in FIGS. 1 and 2, a parison-forming station is shown. Each of the molds 12, 14, 16 comprises mold halves 12a, 14a, 16a affixed to and carried by a mold hanger arm 18. Counterpart mold halves 12b, 14b, 16b are similarly carried on a mold hanger arm 20. The hanger arms 18, 20 are respectively mounted at their leftmost (first) ends 22, 24 for pivotal rotation about a post 26 extending vertically upward from a bracket 28 respectively. The hanger arms 18, 20 have respectively generally planar lower faces 18a, 20a. An operating arm 30 driven into rotation by means not shown is connected to the mold hanger arm 18 by means of a pivotally connected link 32. Similarly, a rotatably driven operating arm 34 is connected to the mold hanger arm 20 by means of a pivotally connected link 36. Rotation of the operating arm 30 in a counter-clockwise direction and the operating arm 34 in a clockwise direction will cause the forward ends 38, 40 of the mold hanger arms 18, 20 to separate and rotate about the axis of the post 26 as indicated by the arrows A—A (FIG. 2). Opposite rotation of the operating arms 30, 34 will force the mold hanger arms 18, 20 into a closed condition preparatory to forming a parison.

FIG. 1 shows mold 14 partially cut-away to show details of the parison molding process. In particular, the mold 14 is surmounted by a plug-forming baffle 44 after a charge of molten glass (not shown) has been deposited within the inside region 46 of the mold 14. A neck ring mold 48 nests captively within the lower portion of the mold 14 and is externally supported by a pair of neck ring mold arms 50 (only one shown). A cylinder system 52 extends a plunger 54 up into the molten mass to force it to conform to the contours of the inside mold region 46 and the inner surfaces (not shown) of the neck ring mold 48. After the plunger 54 is withdrawn from the position shown in FIG. 1, the mold hanger arms 18, 20 are pulled part by actuation of the operating arms 30, 34, and the neck ring arm then transports the parison to a final forming station. Similar baffles, cylinder systems, and plungers are provided to service the other two molds 12, 16.

To provide secure locking of the mold hanger arms 18, 20 together in the closed position shown in FIG. 2, while at the same time compensating for any undesired sagging of the forward ends 38, 40 of the mold hanger arms, a novel locking system 60 is provided.

Figure 3A:
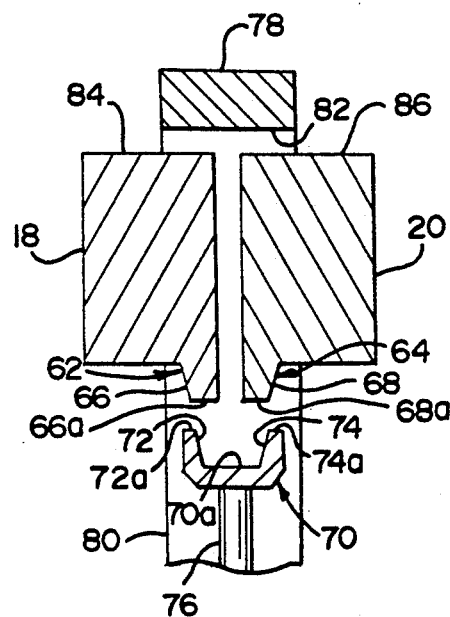
FIGS. 3A-3C are sectional views taken along line 3—3 of FIG. 1 showing the sequence of a mold locking operation.
Figure 3B:
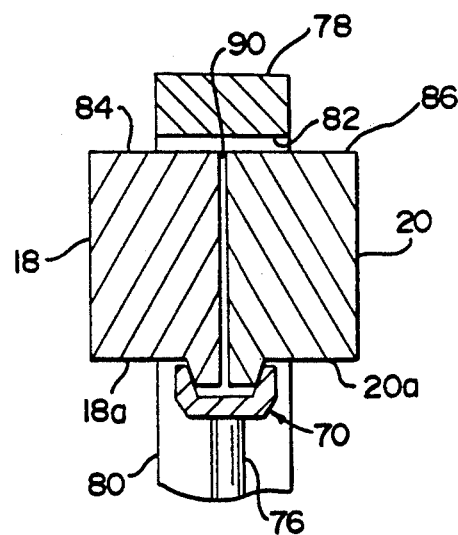
Figure 3C:
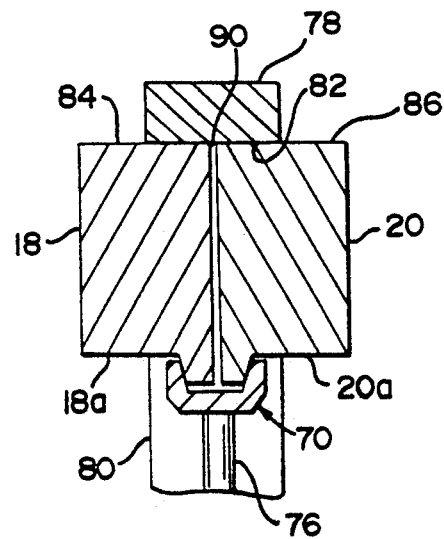

Referring in particular to FIGS. 3A-3C it will be noted that the forward ends 38, 40 (FIG. 2) of the hanger arms 18, 20 are each provided with downwardly extending locking bosses 62, 64. Each of the bosses 62, 64 is provided with a respective planar facet 66, 68, terminating in end faces 66a, 68a, the facets being oriented to extend downward in a convergent direction. A vertically moveable pressure member 70 is provided with a pair of planar jaw facets 72, 74 extending upward from an interior face 70a and terminating in upper faces 72a, 74a respectively. The facets 72, 74 are designed to nestingly receive and engage the locking boss facets 66, 68. The pressure member 70 is raised by a lift piston 71 (FIG. 1) operating a piston shaft 76 affixed to the pressure member 70. Initial lifting of the pressure member 70 engages the locking boss facets 66, 68 to close the mold hangers 18, 20.

A limit stop 78 comprising a vertical member 80 attached to the lift piston 71 and an outwardly extending engaging ledge 82 extending over the upper surfaces 84, 86 of forward ends 38, 40 of the mold hanger arms 18, 20 serves to limit the upward travel of the forward ends 38, 40 of the hanger arms 18, 20, thereby restoring a level condition to the hanger arms 18, 20. Retraction of the pressure member 70 then releases the clamped condition on the hanger arms 18, 20, which can then be operated to a retracted position as previously described.

To ensure that maximum clamping pressure is delivered to the mold halves 12a, 12b, 14a, 14b, 16a, 16b, two methods are employed. First, the forward ends 38, 40 of the mold hanger arms 18, 20 are configured to provide a standoff gap 90 therebetween when the mold halves 12a, 12b, 14a, 14b, 16a, 16b are in contact (see FIGS. 2, 3B, 3C). Second, the length and separation of the facets 66, 68, 72, 74 are established such that with maximum lifting pressure applied (FIG. 3C), there is no bottoming out of the end faces 66a, 68a of the locking bosses 62, 64 with the interior face 70a of the pressure member 70, and such that there is no contact between the upper faces 72a, 74a of the pressure member 70 and the lower faces 18a, 20a of the mold hanger arms 18, 20.

Various alternative configurations for achieving the foregoing results will be evident to those knowledgeable in the art. Thus, for example, the locking bosses 62, 64 could equally well be mounted extending forward from the forward ends 38, 40 of the mold hanger arms 18, 20. Their facets 66, 68 would still be configured to face downward, and would provide the same locking action. In such a configuration, it would also be possible to configure the limit stop 78 to contact the upper surfaces of the forwardly extending bosses. Additionally, the bosses need not be placed immediately adjacent each other as shown in FIGS. 3A-3B. They may readily be placed farther apart on the forward ends 38, 40 of the mold hangers 18, 20. Alternatively, a similar locking system could be provided having recesses in the lower faces of the forward ends 38, 40 of the mold hanger arms 18, 20, with the pressure member 70 configured to enter such recesses and force the jaws together. Still another configuration would be to make the pressure member 70 much wider, to dispense with the locking bosses 62, 64 entirely and engage directly the corners 88, 90 at the lower faces of the mold hangers 18, 20. All such systems, as well as the others that would be immediately apparent to those of ordinary skill in the art may be configured to provide a central feature of the present invention, namely, providing a lifting system which raises the forward ends 38, 40 against a limit stop while at the same time forcing the mold hanger arms 18, 20 together.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

We claim:

1. A mold locking system for a glass molding machine having first and second mold support arms for supporting respectively first and second mold halves, said support arms having first and second ends and upper surfaces, and being pivotally cantilever-mounted at said first ends thereof for rotation about a vertical axis between an open position, where said mold halves are separated, and a closed position, where said mold halves are brought into close proximity with each other, said locking system comprising:
   pressure means for exerting an upward force on said second ends, said pressure means including surfaces configured to pressingly engage portions of said second ends so that operation of said pressure means forces said second ends towards each other; and
   limit stop means for terminating upward travel of said second ends when said support arms are in a given position.

2. The mold locking system of claim 1 wherein said pressure means includes first and second locking bosses affixed respectively to said second ends of said support arms and extending generally parallel to each other, and when in the forming position each boss comprises a planar facet on a portion farthest away from the other boss, said facets being oriented so that their planes converge towards each other, and a pressure member mounted for reciprocating movement in a vertical direction, said pressure member having a recess provided with a pair of facets configured to nestingly accept said boss facets so that upward movement of said pressure member forces said locking bosses together.

3. The mold locking system of claim 2 wherein each boss is disposed near an extremity of each said second end.

4. The mold locking system of claim 3 wherein said bosses extend downwards from said second ends.

5. The mold locking system of claim 4 wherein said extremities of said second ends include confronting planar surfaces having downward extensions forming confronting planar facets of said bosses.

6. The mold locking system of claim 1 wherein said limit stop means is configured for engagement with said upper surfaces at said second ends.

7. A glass molding machine comprising:
   first and second mold support arms for supporting respectively first and second mold halves, said support arms having first and second ends and upper surfaces, and being pivotally cantilever-mounted at said first ends thereof for rotation about a vertical axis between an open position, where said mold halves are separated, and a closed position, where said mold halves are brought into close proximity to each other;
   pressure means for exerting an upward force on said second ends, said pressure means including surfaces configured to pressingly engage portions of said second ends so that operation of said pressure means forces said second ends towards each other; and
   means for terminating upward travel of said second ends when said support arms are in a given position.

8. The glass molding machine of claim 7 wherein said pressure means includes first and second locking bosses affixed respectively to said second ends of said support arms and extending generally parallel to each other, and when in the forming position each boss comprises a planar facet on a portion farthest away from the other boss, said facets being oriented so that their planes converge towards each other, and a pressure member mounted for reciprocating movement in a vertical direction, said pressure member having a recess provided with a pair of facets configured to nestingly accept said boss facets so that upward movement of pressure member forces said bosses together.

9. The mold locking system of claim 8 wherein each boss is disposed near an extremity of each said second end.

10. The glass molding machine of claim 9 wherein said bosses extend downwards from said second ends.

11. The glass molding machine of claim 10 wherein said extremities of said second ends include confronting planar surfaces having downward extensions forming confronting planar facets of said bosses.

12. The glass molding machine of claim 7 wherein said terminating means is configured for engagement with said upper surfaces at said second ends.

13. A mold locking system for a glass molding machine having first and second mold support arms for supporting respectively first and second mold halves, said support arms having first and second ends and upper surfaces and being pivotally cantilever-mounted at said first ends thereof for rotation about a vertical axis between an open position, where said mold halves are separated, and a closed position, where said mold halves are brought into close proximity with each other, said locking system comprising:

first and second locking bosses disposed affixed at the extremities of said second ends of said support arms and extending generally parallel to each other and downwards;

a planar facet on a portion of each boss farthest away from the other boss, said facets being oriented so that their planes converge towards each other;

a pressure member mounted for reciprocating movement in a vertical direction, said pressure member having a recess provided with a pair of facets configured to nestingly accept said boss facets so that upward movement of said pressure member forces said bosses together;

means for raising and lowering said pressure member; and means configured for engagement with said upper surfaces at said second ends for terminating upward travel of said second ends when said support arms are in a given position.

14. A glass molding machine comprising:

first and second mold support arms for supporting respectively first and second mold halves, said support arms having first and second ends and upper surfaces and being pivotally cantilever-mounted at said first ends thereof for rotation about a vertical axis between an open position, where said mold halves are separated, and a closed position, where said mold halves are brought into close proximity with each other:

first and second locking bosses disposed affixed at the extremities of said second ends of said support arms and extending generally parallel to each other and downwards;

a planar facet on a portion of each boss farthest away from the other boss, said facets being oriented so that their planes converge towards each other;

a pressure member mounted for reciprocating movement in a vertical direction, said pressure member having a recess provided with a pair of facets configured to nestingly accept said boss facets so that upward movement of said pressure member forces said bosses together;

means for raising and lowering said pressure member; and means configured for engagement with said upper surfaces at said second ends for terminating upward travel of said second ends when said support arms are in a given position.

* * * * *